(12) United States Patent
Chow et al.

(10) Patent No.: US 10,585,584 B2
(45) Date of Patent: Mar. 10, 2020

(54) VIRTUAL KEYBOARD

(71) Applicant: HEWLETT-PACKARD DEVELOPMENT COMPANY, L.P., Houston, TX (US)

(72) Inventors: John Chow, Taipei (TW); Joe Hsu, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 167 days.

(21) Appl. No.: 15/501,221

(22) PCT Filed: Sep. 29, 2014

(86) PCT No.: PCT/US2014/058047
§ 371 (c)(1),
(2) Date: Feb. 2, 2017

(87) PCT Pub. No.: WO2016/053239
PCT Pub. Date: Apr. 7, 2016

(65) Prior Publication Data
US 2017/0228153 A1    Aug. 10, 2017

(51) Int. Cl.
G06F 3/0488    (2013.01)
G06F 3/041    (2006.01)
G06F 3/042    (2006.01)
G06F 3/02    (2006.01)

(52) U.S. Cl.
CPC ........ G06F 3/04886 (2013.01); G06F 3/0418 (2013.01); G06F 3/0421 (2013.01); G06F 3/02 (2013.01)

(58) Field of Classification Search
CPC .. G06F 3/04886; G06F 3/0237; G06F 3/0426; G06F 3/0418; G06F 3/0421; G06F 3/02
See application file for complete search history.

(56) References Cited

U.S. PATENT DOCUMENTS

| 9,489,086 B1* | 11/2016 | Marsden | ............. G06F 3/04886 |
| 2004/0046744 A1* | 3/2004 | Rafii | ..................... G06F 1/1626 |
| | | | 345/168 |
| 2005/0162402 A1* | 7/2005 | Watanachote | ...... G06F 3/03547 |
| | | | 345/173 |

(Continued)

FOREIGN PATENT DOCUMENTS

| EP | 2775384 A2 | 9/2014 |
| KR | 10-2010-0011131 A | 2/2010 |
| WO | WO-2014/076258 A1 | 5/2014 |

OTHER PUBLICATIONS

"Virtual Keyboard," 2012, pp. 1-2, Brookstone.
(Continued)

*Primary Examiner* — Andrew L Tank
(74) *Attorney, Agent, or Firm* — HPI Patent Department

(57) ABSTRACT

Examples relate to improving typing accuracy using a virtual keyboard. One example enables detection that a key of the virtual keyboard has been pressed and identification of a finger of a user used to press the key of the virtual keyboard. The key that was intended to be pressed may be determined based on the determined key, the finger of the user, and a mapping of finger placement and keys of the virtual keyboard. Functionality associated with pressing the intended key may be performed.

20 Claims, 3 Drawing Sheets

---

600 RECORD INTERACTION BETWEEN USER AND VIRTUAL KEYBOARD

↓

610 DETERMINE THAT A SET OF KEYS OF VIRTUAL KEYBOARD HAVE BEEN SIMULTANEOUSLY PRESSED

↓

620 DETERMINE FINGERS OF USER USED TO PRESS THE SET OF KEYS

↓

630 DETERMINED WHICH KEYS WERE INTENDED TO BE PRESSED, BASED ON FINGERS USED, ROW(S) IN WHICH KEYS OF VIRTUAL KEYBOARD ARE PLACED, AND MAPPING OF KEYS OF THE VIRTUAL KEYBOARD

↓

640 PERFORM FUNCTIONALITY ASSOCIATED WITH PRESSING INTENDED KEYS

(56) References Cited

U.S. PATENT DOCUMENTS

| | | |
|---|---|---|
| 2006/0149732 A1 | 7/2006 | Huang et al. |
| 2006/0190836 A1* | 8/2006 | Ling Su .............. G06F 1/1616 715/773 |
| 2007/0247442 A1 | 10/2007 | Andre et al. |
| 2009/0146957 A1* | 6/2009 | Lee .................. G06F 3/0418 345/168 |
| 2009/0284462 A1 | 11/2009 | Chen et al. |
| 2010/0177035 A1* | 7/2010 | Schowengerdt ....... G06F 1/163 345/156 |
| 2010/0259561 A1* | 10/2010 | Forutanpour ......... G06F 3/0216 345/660 |
| 2010/0315266 A1* | 12/2010 | Gunawardana ....... G06F 3/0237 341/22 |
| 2011/0050576 A1* | 3/2011 | Forutanpour ......... G06F 3/0488 345/168 |
| 2011/0248914 A1* | 10/2011 | Sherr .................. G06F 3/014 345/156 |
| 2011/0254865 A1* | 10/2011 | Yee .................. G06F 3/013 345/661 |
| 2012/0075192 A1* | 3/2012 | Marsden ............. G06F 3/04886 345/168 |
| 2012/0110494 A1* | 5/2012 | Jun .................. G06F 3/0236 715/773 |
| 2012/0162083 A1 | 6/2012 | Zhu |
| 2012/0166995 A1 | 6/2012 | Mcaleer |
| 2012/0260207 A1* | 10/2012 | Treskunov .......... G06F 3/04886 715/773 |
| 2013/0076633 A1 | 3/2013 | Lithwick et al. |
| 2013/0176227 A1* | 7/2013 | Zhai .................. G06F 3/041 345/168 |
| 2013/0212515 A1 | 8/2013 | Eleftheriou |
| 2013/0222247 A1 | 8/2013 | Liu et al. |
| 2013/0257732 A1* | 10/2013 | Duffield ................ G06F 3/0236 345/168 |
| 2013/0321279 A1* | 12/2013 | Engle .................. G06F 3/04886 345/168 |
| 2013/0339895 A1* | 12/2013 | Hirshberg .......... G06F 3/04886 715/773 |
| 2014/0052437 A1 | 2/2014 | Longe et al. |
| 2014/0055343 A1* | 2/2014 | Kim ................ G06F 3/005 345/156 |
| 2014/0055364 A1 | 2/2014 | Sze et al. |
| 2014/0098069 A1 | 4/2014 | Tseng |
| 2014/0176510 A1 | 6/2014 | Nakao |
| 2014/0184511 A1* | 7/2014 | Puustinen .......... G06F 3/04886 345/168 |
| 2014/0247222 A1 | 9/2014 | Ferren |
| 2014/0313168 A1* | 10/2014 | Luo ................ G06F 3/0488 345/175 |
| 2015/0067571 A1* | 3/2015 | Marsden .............. G06F 17/276 715/773 |
| 2015/0293695 A1* | 10/2015 | Schonleben ........ G06F 3/04886 345/173 |
| 2016/0077734 A1* | 3/2016 | Buxton ............. G06F 3/04842 715/773 |
| 2016/0132235 A1* | 5/2016 | Capeder ............ G06F 3/04886 715/773 |

OTHER PUBLICATIONS

Posner et al., "A Single Camera Based Floating Virtual Keyboard with Improved Touch Detection," 2012 IEEE 27th Conv of Electrical and Electronics Engineers, Nov. 14-17, 2012.

\* cited by examiner

FIG. 5

| KEY(S) | ROW | FINGER | LAST REVISION | APPLICATION IDENTIFIER |
|---|---|---|---|---|
| CAPS LOCK | 4 | L1 | N/A | MSWORD |
| A | 4 | L1 | N/A | MSWORD |
| S | 4 | L2 | N/A | MSWORD |
| D | 4 | L3 | N/A | MSWORD |
| F | 4 | L4 | N/A | MSWORD |
| G | 4 | L4 | N/A | MSWORD |
| H | 4 | R4 | N/A | MSWORD |
| J | 4 | R4 | N/A | MSWORD |
| K | 4 | R3 | N/A | MSWORD |
| L | 4 | R2 | N/A | MSWORD |
| ; | 4 | R1 | N/A | MSWORD |
| ' | 4 | R1 | N/A | MSWORD |
| ENTER | 4 | R1 | N/A | MSWORD |
| PG DN | 4 | R1 | N/A | MSWORD |

FIG. 6

600 RECORD INTERACTION BETWEEN USER AND VIRTUAL KEYBOARD

610 DETERMINE THAT A SET OF KEYS OF VIRTUAL KEYBOARD HAVE BEEN SIMULTANEOUSLY PRESSED

620 DETERMINE FINGERS OF USER USED TO PRESS THE SET OF KEYS

630 DETERMINED WHICH KEYS WERE INTENDED TO BE PRESSED, BASED ON FINGERS USED, ROW(S) IN WHICH KEYS OF VIRTUAL KEYBOARD ARE PLACED, AND MAPPING OF KEYS OF THE VIRTUAL KEYBOARD

640 PERFORM FUNCTIONALITY ASSOCIATED WITH PRESSING INTENDED KEYS

FIG. 7

700 DETERMINE MAPPING BASED ON CALIBRATION OF USER WITH VIRTUAL KEYBOARD

VIRTUAL KEYBOARD

BACKGROUND

A virtual keyboard may be projected onto a surface and be communicably coupled to a computing device. A user's interaction with the keyboard may be monitored, and input obtained via the projected virtual keyboard may be provided to a computer for processing.

BRIEF DESCRIPTION OF THE DRAWINGS

The following detailed description references the drawings, wherein:

FIG. 5 is an example table comprising an example mapping of keys for a virtual keyboard;

FIG. 6 is a flowchart of an example method for execution by a system for improving typing accuracy of a virtual keyboard; and FIG. 7 is a flowchart of an example method for execution by a system for Improving typing accuracy of a virtual keyboard.

DETAILED DESCRIPTION

Figure 1:
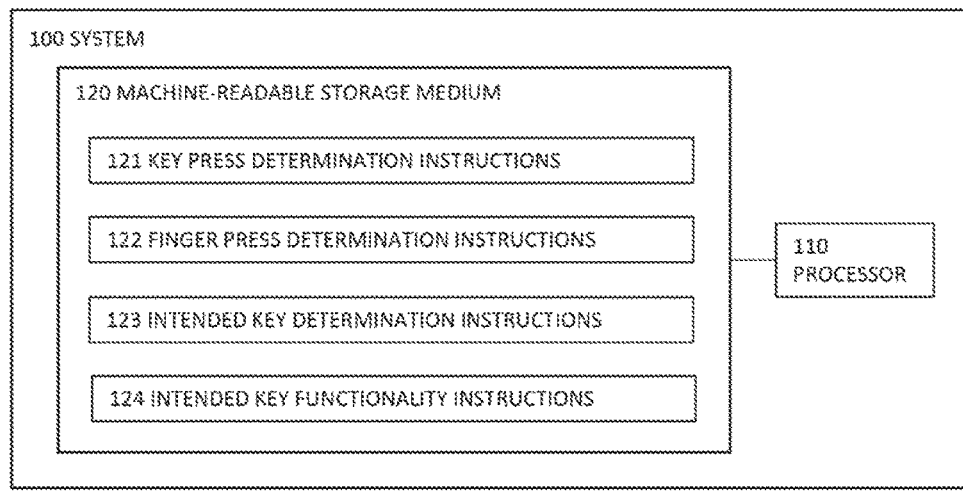
FIG. 1 is a block diagram of an example system for improving typing accuracy of a virtual keyboard.

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

A virtual keyboard may be projected onto a surface and be communicably coupled to a computing device. Typing accuracy from a user of a virtual keyboard may be poorer than the typing accuracy of the user of a physical keyboard coupled to and/or integrated with the computing device. For example, because there may be no tactile feedback by pressing a key of a virtual keyboard, a user may be more likely to make contact with an unintended key.

To address this issue, a system may detect that a key of the projected virtual keyboard has been pressed and may identify a finger of the user that was used to press the key on the virtual keyboard. The system may then predict which key was intended to be pressed based on the pressed key, the identified finger, and a mapping of finger placement to keys of the projected virtual keyboard. As such, the typing accuracy from a user of a virtual keyboard may be improved by employing predictive technology that selects the key that a user intended to press rather than the unintended key that the user pressed. The system may then perform whatever functionality is associated with pressing the intended key, thus improving the user experience with the virtual keyboard.

The mapping of a user's fingers to keys of a virtual keyboard may be based on the virtual keyboard being projected, may be calibrated to the particular user, to a particular application, based on whether capacitive sensors, cameras, and/or other components may be used in conjunction with the virtual keyboard, and/or based on other factors.

Referring now to the drawings, FIG. 1 is a block diagram of an example system 100 for improving typing accuracy of a virtual keyboard. System may comprise a notebook, desktop, tablet, workstation, mobile device, retail point of sale device, smartphone, all-in-one (AiO) computer, gaming device, or any other device suitable for executing the functionality described below. In the example depicted in FIG. 1, system 100 includes a non-transitory machine-readable storage medium 120 and a processor 110.

Processor 110 may be one or more central processing units (CPUs), microprocessors, and/or other hardware devices suitable for retrieval and execution of instructions stored in machine-readable storage medium 120. Processor 110 may fetch, decode, and execute program instructions 121, 122, 123, 124, and/or other instructions to improve typing accuracy on a virtual keyboard, as described below. As an alternative or in addition to retrieving and executing instructions, processor 110 may include one or more electronic circuits comprising a number of electronic components for performing the functionality of one or more of instructions 121, 122, 123, 124, and/or other instructions.

In one example, the program instructions 121, 122, 123, 124, and/or other instructions can be part of an installation package that can be executed by processor 110 to implement the functionality described herein. In this case, memory 120 may be a portable medium such as a CD, DVD, or flash drive or a memory maintained by a computing device from which the installation package can be downloaded and installed. In another example, the program instructions may be part of an application or applications already installed on system 100.

Machine-readable storage medium 120 may be any hardware storage device for maintaining data accessible to system 100. For example, machine-readable storage medium 120 may include one or more hard disk drives, solid state drives, tape drives, and/or any other storage devices. The storage devices may be located in system 100 and/or in another device in communication with system 100. For example, machine-readable storage medium 120 may be any electronic, magnetic, optical, or other physical storage device that stores executable instructions. Thus, machine-readable storage medium 120 may be, for example, Random Access Memory (RAM), an Electrically-Erasable Programmable Read-Only Memory (EEPROM), a storage drive, an optical disc, and the like. As described in detail below, machine-readable storage medium 120 may be encoded with executable instructions for improving typing accuracy on a virtual keyboard. As detailed below, storage medium 120 may maintain and/or store the data and information described herein.

In some examples, the storage medium 120 may store information related to the mapping of keys of the keyboard to fingers of a user. A mapping may comprise information related to each key of the keyboard, multiple combinations of keys that may be simultaneously pressed, and/or other sets of keys on the keyboard. For example, for an individual key (e.g., "f") or combination of keys (e.g., control-altdelete), the mapping may comprise information related to an identifier of the key/combination (e.g., the key or keys being pressed), an identifier of a user, an indication of a row (or rows) of the key in the keyboard, an indication of a finger (or fingers) of the user that may be used to press the key, a time/date at which the mapping for the key/combination was last revised, an identifier of an application for which the mapping might relate, and/or other information related to mapping the key/combination to a finger (or set of fingers).

In some examples, the storage medium 120 may store a single mapping that may be stored for use over various applications. In some examples, the storage medium 120 may store a default mapping as well as a set of custom mappings, where each individual custom mapping relates to a user, application, and/or context in which the custom mapping may be used. In some examples, the storage medium 120 may also store mappings for each user of the system 100 and/or user of the virtual keyboard.

In some examples, a virtual keyboard may be projected for use in communication with system 100. The virtual keyboard may be projected by a component of the system 100, may be projected by a third party device, and/or may otherwise be made available for use with the system 100. The virtual keyboard may be projected by a component that may be communicably coupled to the system 100, such that the processor 110 and/or other components of the system 100 may receive information input via the virtual keyboard and may cause changes responsive to the information received from the virtual keyboard.

Key press determination instructions 121, when executed by processor 10, may detect that a key of the virtual keyboard has been pressed. In some examples, the key press determination instructions 121, when executed by processor 110, may record interaction between the user and the virtual keyboard. For example, the key press determination instructions 121, when executed by processor 110, may detect that a key of the virtual keyboard has been pressed responsive to receiving an indication that a key has been pressed, responsive to obtaining input related to the key press, responsive to viewing the key press by a camera communicably coupled to the system 100, responsive to receiving feedback of the key press from a capacitive sensor communicably coupled to the system 100 (e.g., disposed in a mat on which the virtual keyboard is projected, and/or otherwise able to receive feedback from a user press of a key), and/or in other manners.

In some examples, key press determination instructions 121, when executed by processor 110, may detect that a set of keys of the virtual keyboard have been simultaneously pressed. The key press determination instructions 121, when executed by processor 110, may detect that the set of keys have been pressed in a manner the same as or similar to detecting that a single key has been pressed.

Finger press determination instructions 122, when executed by processor 110, may identify a finger of a user used to press the key of the virtual keyboard. The finger press determination instructions 122, when executed by processor 110, may determine which finger of the user pressed the key of the virtual keyboard based on information received from a camera, sensor, and/or other input device communicably coupled to the system 100. As mentioned above, system 100 may record interactions between the user and the virtual keyboard (e.g., via a camera, a capacitive sensor providing information to the system 100, and/or other recording device). The finger press determination instructions 122, en executed by processor 110, may determine which finger of the user pressed the key of the virtual keyboard based on the recorded information.

In some examples in which the key press determination instructions 121, when executed by processor 110, have determined that a set of keys have been pressed, the finger press determination instructions 122, when executed by processor 110, may identify the set of fingers used to press the set of keys of the virtual keyboard. The finger press determination instructions 122, when executed by processor 110, may identify the set of fingers in a manner the same as or similar to identifying the finger used to press a single key.

Intended key determination instructions 123, when executed by processor 110, may determine which key was intended to be pressed based on the determined key, the finger of the user, and a mapping of finger placement and keys of the virtual keyboard. The intended key determination instructions 123, when executed by processor 110, may determine a row in which the pressed key is placed. For example, the intended key determination instructions 123, when executed by processor 110, may determine the row in a manner similar to determining which key was pressed and/or which finger was used to press the key.

The intended key determination instructions 123, when executed by processor 110, may determine which key was intended to be pressed by determining, from the mapping of the keys on the virtual keyboard, the key associated with the row and the finger used to press the key. In some examples, additional information related to context of use may also be considered when determining the intended key from the mapping.

In some examples, the intended key determination instructions 123, when executed by processor 110, may select a mapping to use to determine the intended key. For example, the intended key determination instructions 123, when executed by processor 110, may determine which mapping should be used based on the mappings stored in the storage medium 120. For example, the intended key determination instructions 123, when executed by processor 110, may determine whether any of the mappings are customized for the user.

Responsive to no mappings being customized for the user, the intended key determination instructions 123, when executed by processor 110, may determine whether any of the mappings are customized for the application in use. Responsive to no mappings being customized for the user or the application in use, the intended key determination instructions 123, when executed by processor 110, may determine whether there are any other relevant customized mappings based on context. Responsive to no mappings being customized for the user, the application in use, or other context, the intended key determination instructions 123, when executed by processor 110, may select a default mapping for use.

Responsive to at least one mapping being customized for the user, the intended key determination instructions 123, when executed by processor 110, may determine whether there are any other relevant customized mappings based or context (e.g., based on application in use, keyboard being used, and/or other context). Responsive to no mappings being customized for the user and based on context, the intended key determination instructions 123, when executed by processor 110, may select a mapping customized for the user. Responsive to mappings being available customized for the user and based on context, the intended key determination instructions 123, when executed by processor 110, may select a mapping based on the appropriate customizations. Responsive to no mappings being customized for the user, the intended key determination instructions 123, when executed by processor 110, may select appropriate customized mappings based solely on context in a same or similar manner.

In some examples in which the key press determination instructions 121, when executed by processor 110, have determined that a set of keys have been pressed, the intended key determination instructions 123, when executed by processor 110, may determine which set of keys were intended to be pressed based on the determined set of keys, the set of fingers of the user, and a mapping of finger placement and keys of the virtual keyboard. The intended key determination instructions 123, when executed by processor 110, may determine which set of keys were intended to be pressed in a manner the same as or similar to determining which single key was intended to be pressed.

Intended key functionality instructions 124, when executed by processor 110, may perform functionality associated with pressing the intended key. The functionality may be determined by the context of the system 100 (e.g, based on the application currently being executed, and/or based on other context). For example, the intended key functionality instructions 124, when executed by processor 110, may make available, for display to the user, an indication of a letter associated with the intended key. In this example, the letter associated with the intended key may be different from the letter associated with the key pressed by the user.

In some examples, the system 100 may comprise additional instructions that may be executed by processor 110 to perform functionality. For example, the system 100 may comprise instructions, which, when executed by processor 110, revise the mapping of finger placement and keys of the virtual keyboard based on input received from the user responsive to making available, for display to the user, the indication of the letter associated with the intended key. In another example, the system 100 may comprise instructions, which, when executed by processor 110, determine the mapping based on a calibration of the user with the virtual keyboard, wherein the calibration comprises monitoring placement of fingers of user on keys of the virtual keyboard.

Figure 2:
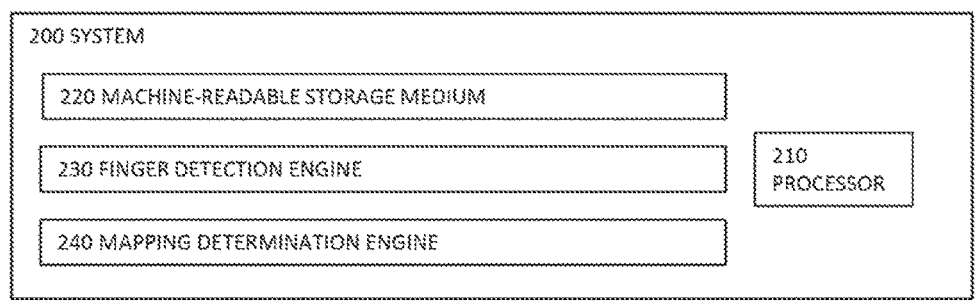
FIG. 2 is a block diagram of an example system for improving typing accuracy of a virtual keyboard.

FIG. 2 is a block diagram of an example system 200 for improving typing accuracy using a virtual keyboard. As with system 100, system 200 may be a cloud server, a mainframe, notebook, desktop, tablet, workstation, mobile device, or any other device suitable for executing the functionality described below. As with processor 110 of FIG. 1, processor 220 may be one or more CPUs, microprocessors, and/or other hardware devices suitable for retrieval and execution of instructions. As with storage medium 120 of FIG. 1, machine-readable storage medium 220 may be any hardware storage device for maintaining data accessible to system 100 and may comprise information similar to that stored in storage medium 120.

As detailed below, system 200 may include a series of engines 230-240 for improving typing accuracy using a virtual keyboard. Each of the engines may generally represent any combination of hardware and programming. For example, the programming for the engines may tie processor executable instructions stored on a non-transitory machine-readable storage medium and the hardware for the engines may include at least one processor of the system 200 to execute those instructions, in addition or as an alternative, each engine may include one or more hardware devices including electronic circuitry for implementing the functionality described below.

In some examples, system 200 may also comprise a camera, set of capacitive sensors, and/or other components that may be used in improving typing accuracy of a virtual keyboard (e.g., as described below with respect to FIG. 3).

Finger detection engine 230 may detect, based on feedback received from one or both of a capacitive sensor or a camera, that a key of the virtual keyboard has been pressed by a finger of the user. In some examples, the finger detection engine 230 may perform this functionality in a manner the same as or similar to that of the key press determination instructions 121, finger press determination instructions 122, and/or other instructions of system 100. Further details regarding an example implementation of finger detection engine 230 are provided above in connection with key press determination instructions 121, finger press determination instructions 122, and/or other instructions of FIG. 1.

Mapping determination engine 240 may predict which key was intended to be pressed based the finger of the user used to press the detected key, a row in which the key of the virtual keyboard is placed, and a mapping of keys of the virtual keyboard. Mapping determination engine 240 may also perform functionality associated with pressing the intended key. For example, mapping determination engine 240 may perform functionality associated with pressing the intended key by making available, for display to the user, an indication of a letter associated with the intended key, wherein the letter associated with the intended key is different from a letter associated with the pressed key.

In some examples, the mapping determination engine 240 may perform this functionality in a manner the same as or similar to that of the intended key determination instructions 123, intended key functionality instructions 124, and/or other instructions of system 100. Further details regarding an example implementation of mapping determination engine 240 are provided above in connection with intended key determination instructions 123, intended key functionality instructions 124, and/or other instructions of FIG. 1.

Figure 3:
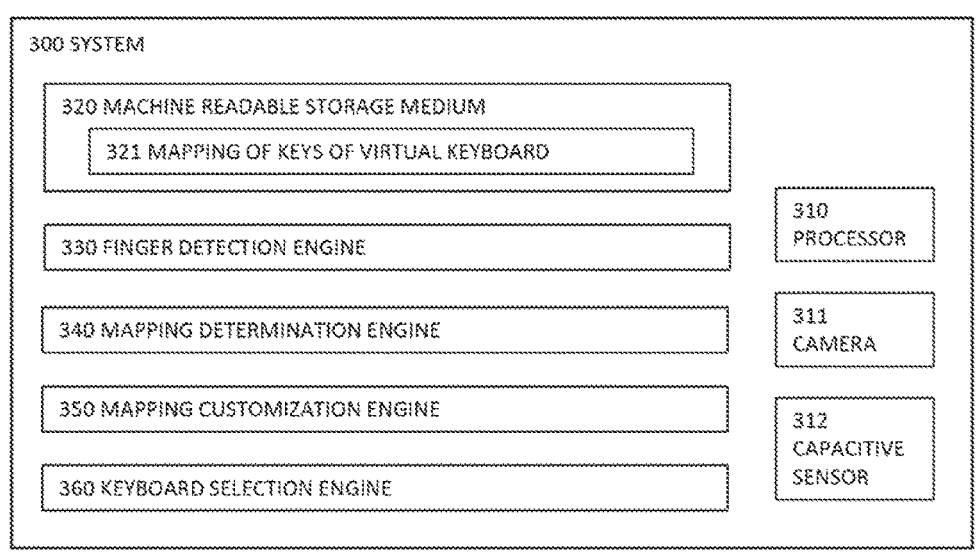
FIG. 3 is a block diagram of an example system for improving typing accuracy of a virtual keyboard.

FIG. 3 is a block diagram of an example system 200 for improving typing accuracy using a virtual keyboard. As with system 100, system 200 may be a cloud server, a mainframe, notebook, desktop, tablet, workstation, mobile device, or any other device suitable for executing the functionality described below. As with processor 110 of FIG. 1, processor 320 may be one or more CPUs, microprocessors, and/or other hardware devices suitable for retrieval and execution of instructions. As with storage medium 320 of FIG. 1, machine-readable storage medium 320 may be any hardware storage device for maintaining data accessible to system 100 and may comprise information similar to that stored in storage medium 320. For example, machine-readable storage medium 320 may comprise a mapping 321 (and/or set of mappings 321) of keys of the virtual keyboard. In some examples, the set of mappings 321 may comprise a default mapping, a set of customized mappings, and/or other mappings of keys of the virtual keyboard.

As detailed below, system 300 may include a series of engines 330-370 for improving typing accuracy using a virtual keyboard. Each of the engines may generally represent any combination of hardware and programming. For example, the programming for the engines may be processor executable instructions stored on a non-transitory machine-readable storage medium and the hardware for the engines may include at least one processor of the system 300 to execute those instructions. In addition or as an alternative, each engine may include one or more hardware devices including electronic circuitry for implementing the functionality described below.

In some examples, system 300 may also comprise a camera 311, a set of capacitive sensors 312, and/or other components that may be used in improving typing accuracy of a virtual keyboard.

Finger detection engine 330 may detect, based on feedback received from one or both of a capacitive sensor 312 or a camera 311, that a key of the virtual keyboard has been pressed by a finger of the user. In some examples, the finger detection engine 330 may perform functionality in a manner the same as or similar to that of the key press determination instructions 121, finger press determination instructions 122, and/or other instructions of system 100, and/or finger detection engine 230 of system 200. Further details regarding an example implementation of finger detection engine 330 are provided above in connection with key press determination instructions 121, finder press determination instructions 122, and/or other instructions of system 100, and/or finger detection engine 230 of system 200.

Mapping determination engine 340 may predict which key was intended to be pressed based on the finger of the user used to press the detected key, a row in which the key of the virtual keyboard is placed, and a mapping of keys of the virtual keyboard. In some examples, the mapping determination engine 340 may perform functionality in a manner the same as or similar to that of the intended key determination instructions 123, intended key functionality instructions 124, and/or other instructions of system 100, and/or mapping determination engine 240 of system 200. Further details regarding an example implementation of mapping determination engine 340 are provided above in connection with intended key determination instructions 123, intended key functionality instructions 124, and/or other instructions of system 100, and/or mapping determination engine 240 of system 200.

Mapping customization engine 350 may revise the mapping of keys of the virtual keyboard. The mapping customization engine 350 may, for example, revise a mapping of keys based on input received from the user. The input received from the user may be obtained during a calibration process, may be obtained responsive to making available, for display to the user, the indication of the letter associated with the intended key, and/or may be otherwise obtained.

In some examples, the mapping customization engine 350 may revise a mapping of keys based on calibration process with the user. For example, the mapping customization engine 350 may prompt the user to enter specific text, may monitor the user's input, and may revise a mapping for the user based on the user's input of the text. In another example, the mapping customization engine 350 may detect user trends of typing to revise the mapping. For example, responsive to the user using a particular finger to press an unintended key (instead of an intended key from the text that the user was prompted to enter) a predetermined percentage of times, the mapping customization engine 350 may revise the mapping to indicate use of the particular finger in the row in which the unintended key was pressed maps to the key the user intended to press.

In some examples, the mapping customization engine 350 may revise a mapping based on user input received responsive to making available, for display to the user, the indication of the letter associated with the determined intended key. For example, responsive to making available for display an indication of the letter associated with the determined intended key, and receiving input from the user to change the displayed letter (e.g., wherein the response includes deletion or changing of the letter), the mapping customization engine 350 may revise the mapping between the user's finger, the row associated with the pressed key, and the intended key such that the replacement key by the user replaces the existing intended key.

In some examples, the mapping customization engine 350 may prompt the user to confirm a potential revision to a mapping before the mapping customization engine 350 changes the mapping stored in the storage medium 320. Responsive to receiving confirmation to change the mapping, the mapping customization engine 350 may change the mapping stored in the storage medium 320. Responsive to no confirmation being received, the mapping customization engine 350 may not change the mapping. In some examples, responsive to no response being received from the user within a predetermined time period after prompting the user, the mapping customization engine 350 may change the mapping.

In some examples, the mapping customization engine 350 may select a mapping (and/or set of mappings) to revise based on the user using the system 300, and/or context of use (e.g., application being used, keyboard being used, and/or other characteristics of the context of use).

The mapping customization engine 350 may revise a mapping in other ways as well, and is not limited to the examples described herein.

Keyboard selection engine 360 may receive, from the user, information related to a type of virtual keyboard for use with the system 300. For example, multiple types of keyboards may be able to be projected for use with the system 300. Based on input related to which type of keyboard to be used, the keyboard selection engine 360 may cause projection of the selected keyboard type and may cause use of mappings for the selected keyboard type while determining intended keys and improving typing accuracy. Example types of keyboards include, but are not limited to, QWERTY, Dvorak, Colemak, and/or other types of keyboards.

Figure 4:
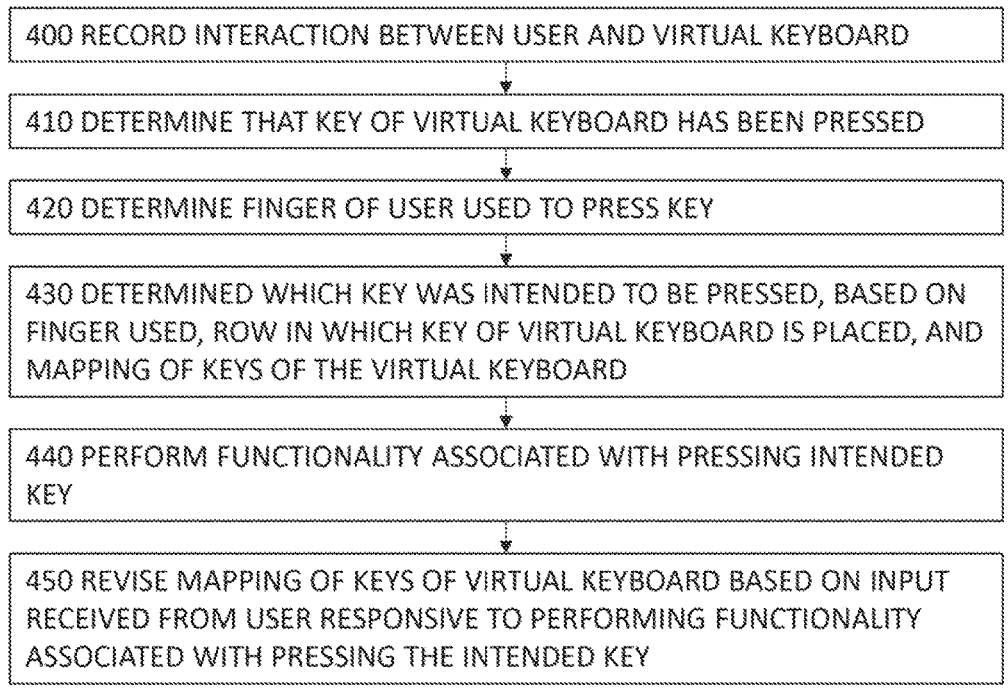
FIG. 4 is a flowchart of an example method for execution by a system for improving typing accuracy of a virtual keyboard.

FIG. 4 is a flowchart of an example method for execution by a system for improving typing accuracy of a virtual keyboard.

Although execution of the method described below is with reference to system 300 of FIG. 3, other suitable devices for execution of this method will be apparent to those of skill in the art (e.g., system 100 of FIG. 1, and/or system 200 of FIG. 2, and/or other devices). The method described in FIG. 4 and other figures may be implemented in the form of executable instructions stored on a machine-readable storage medium, such as storage medium 320, by one or more engines described herein, and/or in the form of electronic circuitry.

In an operation 400, an interaction between the user and the virtual keyboard may be recorded. For example, the system 300 (and/or the finger detection engine 330, or other resource of the system 300) may record the interaction. The system 300 may record the interaction in a manner similar or the same as that described above in relation to the execution of the finger detection engine 330, and/or other resource of the system 300.

In an operation 410, the key of the virtual keyboard that was pressed may be determined. For example, the system 300 (and/or the finger detection engine 330, mapping determination engine 340, or other resource of the system 300) may determine which key was pressed. The system 300 may determine which key was pressed in a manner similar or the same as that described above in relation to the execution of the finger detection engine 330, mapping determination engine 340, and/or other resource of the system 300.

In an operation 420, a finger used to press the key may be determined. For example, the system 300 (and/or the finger detection engine 330, or other resource of the system 300) may determine the finger used to press the key. The system 300 may determine the finger in a manner similar or the same as that described above in relation to the execution of the finger detection engine 330, and/or other resource of the system 300.

In an operation 430, the key which was intended to be pressed may be determined, based on the finger used, the row in which the pressed key is placed, and a mapping of the keys of the virtual keyboard. For example, the system 300 (and/or the mapping determination engine 340, or other resource of the system 300) may determine which key was intended to be pressed. The system 300 may determine which key was intended to be pressed in a manner similar or the same as that described above in relation to the execution of the mapping determination engine 340, and/or other resource of the system 300.

In an operation 440, functionality associated with pressing the intended key may be performed. For example, the system 300 (and/or the mapping determination engine 340, or other resource of the system 300) may perform the functionality. The system 300 may perform the functionality in a manner similar or the same as that described above in relation to the execution of the mapping determination engine 340, and/or other resource of the system 300.

Figure 4A:
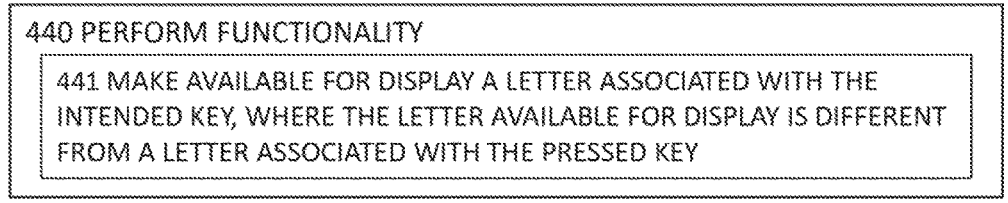
FIG. 4A is a flowchart of an example method for execution by a system for performing functionality associated with pressing an intended key on an example virtual keyboard.

FIG. 4A is a flowchart of an example method for execution by a system for performing functionality associated with pressing an intended key on an example virtual keyboard.

In some examples, and as illustrated in FIG. 4A, in an operation 441, a letter associated with the intended key may be made available for display, where the letter available for display is different from a letter associated with the pressed key. For example, the system 300 (and/or the mapping determination engine 340, or other resource of the system 300) may make the letter associated with the intended key available for display. The system 300 may make the letter associated with the intended key available for display in a manner similar or the same as that described above in relation to the execution of the mapping determination engine 340, and/or other resource of the system 300.

Returning to FIG. 4, in an operation 450, the mapping of keys of the virtual keyboard may be revised based on input received from the user responsive to performing the functionality associated with pressing the intended key. For example, the system 300 (and/or the mapping customization engine 350, or other resource of the system 300) may revise the mapping. The system 300 may revise the mapping in a manner similar or the same as that described above in relation to the execution of the mapping customization engine 350, and/or other resource of the system 300.

Figure 4B:
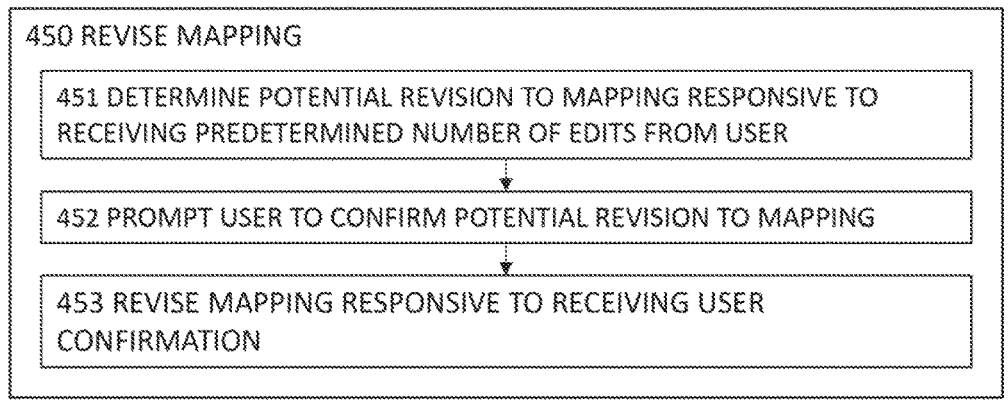
FIG. 4B is a flowchart of an example method for execution by a system for revising a mapping of keys of an example virtual keyboard.

FIG. 4B is a flowchart of an example method for execution by a system for revising a mapping of keys of an example virtual keyboard.

In some examples, and as illustrated in FIG. 4B, in an operation 451, a potential revision to the mapping may be determined responsive to receiving a predetermined number of edits from the user. For example, the system 300 (and/or the mapping customization engine 350, or other resource of the system 300) may determine the potential revision. The system 300 may determine the potential revision in a manner similar or the same as that described above in relation to the execution of the mapping customization engine 350, and/or other resource of the system 300.

In an operation 452, the user may be prompted to confirm the potential revision to the mapping. For example, the system 300 (and/or the mapping customization engine 350, or other resource of the system 300) may prompt the user. The system 300 may prompt the user in a manner similar or the same as that described above in relation to the execution of mapping customization engine 350, and/or other resource of the system 300.

In an operation 453, the mapping may be revised responsive to receiving user confirmation. For example, the system 300 (and/or the mapping customization engine 350, or other resource of the system 300) may revise the mapping. The system 300 may revise the mapping in a manner similar or the same as that described above in relation to the execution of the mapping customization engine 350, and/or other resource of the system 300.

FIG. 5 is an example table comprising an example mapping of keys for a virtual keyboard. As mentioned above, the storage medium 120 may store a single mapping that may be stored for use over various applications. In some examples, the storage medium 120 may store a default mapping as well as a set of custom mappings, where each individual custom mapping relates to an application and/or context in which the custom mapping may be used. In some examples, the storage medium 120 may also store mappings for each user of the system 100 and/or user of the virtual keyboard. The example mapping depicted in FIG. 5 may comprise a custom mapping for an application.

As such, the example mapping depicted in FIG. 5 may comprise information related to a set of keys in a single row of a virtual keyboard. The information may comprise, for example, an identifier of an individual key, an indication of a row of the key in the keyboard, an indication of a finger of the user that may be used to press the key, a time/date at which the mapping for the key/combination was last revised, an identifier of an application for which the mapping might relate, and/or other information related to mapping the key/combination to a finger.

FIG. 6 is a flowchart of an example method for execution by a system for improving typing accuracy of a virtual keyboard.

In an operation 600, an interaction between the user and the virtual keyboard may be recorded. For example, the system 300 (and/or the finger detection engine 330, or other resource of the system 300) may record the interaction. The system 300 may record the interaction in a manner similar or the same as that described above in relation to the execution of the finger detection engine 330, and/or other resource of the system 300.

In an operation 610, a set of keys of the virtual keyboard that were simultaneously pressed may be determined. For example, the system 300 (and/or the finger detection engine 330, mapping determination engine 340, or other resource of the system 300) may determine the set of keys that were pressed. The system 300 may determine the set of keys that were pressed in a manner similar or the same as that described above in relation to the execution of the finger detection engine 330, mapping determination engine 340, and/or other resource of the system 300.

In an operation 620, the fingers used to press the set of keys may be determined. For example, the system 300 (and/or the finger detection engine 330, or other resource of the system 300) may determine the fingers used to press the set of keys. The system 300 may determine the fingers in a manner similar or the same as that described above in relation to the execution of the finger detection engine 330, and/or other resource of the system 300.

In an operation 630, the set of keys which were intended to be pressed may be determined, based on the fingers used, the row(s) in which the pressed key is placed, and a mapping of the keys of the virtual keyboard. For example, the system 300 (and/or the mapping determination engine 340, or other resource of the system 300) may determine which set of keys were intended to be pressed. The system 300 may determine which set of keys were intended to be pressed in a manner similar or the same as that described above in relation to the execution of the mapping determination engine 340, and/or other resource of the system 300.

In an operation 640, functionality associated with pressing the intended set of keys may be performed. For example, the system 300 (and/or the mapping determination engine 340, or other resource of the system 300) may perform the functionality. The system 300 may perform the functionality in a manner similar or the same as that described above in relation to the execution of the mapping determination engine 340, and/or other resource of the system 300.

FIG. 7 is a flowchart of an example method for execution by a system for improving typing accuracy of a virtual keyboard.

In an operation 700, a mapping may be determined based on a calibration of the user with the virtual keyboard. For example, the system 300 (and/or the mapping customization engine 350, or other resource of the system 300) may determine the mapping. The system 300 may determine the mapping in a manner similar or the same as that described above in relation to the execution of the mapping customization engine 350, and/or other resource of the system 300.

The foregoing disclosure describes a number of examples for improving typing accuracy of a virtual keyboard. The disclosed examples may include systems, devices, computer-readable storage media, and methods for improving typing accuracy of a virtual keyboard. For purposes of explanation, certain examples are described with reference to the components illustrated in FIGS. 1-7. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Further, the sequence of operations described in connection with FIGS. 1-7 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

We claim:

1. A non-transitory machine-readable storage medium comprising instructions for improving typing accuracy using a virtual keyboard, the instructions upon execution causing a computing device to:
   determine that a key of the virtual keyboard has been pressed by a user;
   select a mapping of finger placement and keys of the virtual keyboard from a plurality of different mappings based on an identifier of the user, an identifier of an application program executed when the key was pressed, and a type of the virtual keyboard, the selected mapping customized to the user, the application program, and the type of the virtual keyboard, wherein each mapping of the plurality of different mappings comprises a respective user identifier, a respective application program identifier, and virtual keyboard type information;
   determine a finger of the user used to press the key of the virtual keyboard;
   determine an intended key that was intended to be pressed based on the key, the finger of the user, and the selected mapping; and
   perform functionality associated with pressing the intended key.

2. The non-transitory machine-readable storage medium of claim 1, wherein the instructions to perform the functionality associated with pressing the intended key comprise instructions to:
   make available, for display to the user, an indication of a letter associated with the intended key.

3. The non-transitory machine-readable storage medium of claim 2, wherein the letter associated with the intended key is different from a letter associated with the pressed key.

4. The non-transitory machine-readable storage medium of claim 3, further comprising instructions that upon execution cause the computing device to:
   revise the selected mapping of finger placement and the keys of the virtual keyboard based on input received from the user responsive to making available, for display to the user, the indication of the letter associated with the intended key.

5. The non-transitory machine-readable storage medium of claim 1, further comprising instructions that upon execution cause the computing device to:
   calibrate the selected mapping to the user, the calibrating comprising monitoring placement of fingers of the user on keys of the virtual keyboard.

6. The non-transitory machine-readable storage medium of claim 1, further comprising instructions that upon execution cause the computing device to:
   determine that a set of keys of the virtual keyboard have been simultaneously pressed;
   determine a set of fingers of the user used to press the set of keys of the virtual keyboard;
   determine a set of intended keys which were intended to be pressed based on the determined set of keys, the set of fingers of the user, and the selected mapping; and
   perform functionality associated with pressing the set of intended keys.

7. The non-transitory machine-readable storage medium of claim 1, further comprising instructions that upon execution cause the computing device to:
   cause projection of the virtual keyboard onto a mat, and wherein determining that the key of the virtual keyboard has been pressed is based on an image captured by a camera of user interaction with the mat.

8. The non-transitory machine-readable storage medium of claim 1, wherein different mappings of the plurality of different mappings are customized to different types of virtual keyboards.

9. The non-transitory machine-readable storage medium of claim 1, wherein different mappings of the plurality of different mappings are customized to different application programs, wherein a first mapping of the plurality of different mappings comprises a first user identifier and a first application program identifier, and a second mapping of the plurality of different mappings comprises a second user identifier and a second application program identifier different from the first application program identifier.

10. A system comprising:
a sensor to record interaction between a user and a virtual keyboard;
a processor; and
a non-transitory storage medium storing instructions executable on the processor to:
determine that a key of the virtual keyboard has been pressed by a finger of the user based on the recorded interaction:
select a mapping of finger placement and keys of the virtual keyboard from a plurality of different mappings based on an identifier of the user, an identifier of an application program executed when the key was pressed, and a type of the virtual keyboard, the selected mapping customized to the user, the application program, and the type of the virtual keyboard, wherein each mapping of the plurality of different mappings comprises a respective user identifier, a respective application program identifier, and virtual keyboard type information;
determine an intended key that was intended to be pressed based on the finger of the user, a row in which the key of the virtual keyboard is placed, and the selected mapping; and
perform functionality associated with pressing the intended key.

11. The system of claim 10, wherein the instructions are executable on the processor to make available, for display to the user, an indication of a letter associated with the intended key, wherein the letter associated with the intended key is different from a letter associated with the pressed key.

12. The system of claim 11, wherein the instructions are executable on the processor to further:
revise the selected mapping based on input received from the user responsive to making available, for display to the user, the indication of the letter associated with the intended key.

13. The system of claim 10, wherein the instructions are executable on the processor to further:
receive, from the user, information related to the type of virtual keyboard for use with the system.

14. The system of claim 10, wherein the instructions are executable on the processor to cause projection of the virtual keyboard onto a mat that comprises capacitive sensors to sense touch of fingers of the user with the mat.

15. The system of claim 10, wherein the sensor comprises a camera or a capacitive sensor.

16. A method for improving typing accuracy using a virtual keyboard, the method comprising:
recording, by a computing device, interaction between a user and the virtual keyboard;
determining, by the computing device, that a key of the virtual keyboard has been pressed;
selecting, by the computing device, a mapping of finger placement and keys of the virtual keyboard from a plurality of different mappings based on an identifier of the user, an identifier of an application program executed when the key was pressed, and a type of the virtual keyboard, the selected mapping customized to the user, the application program, and the type of the virtual keyboard, wherein each mapping of the plurality of different mappings comprises a respective user identifier, a respective application program identifier, and virtual keyboard type information;
determining, by the computing device, a finger of the user used to press the key of the virtual keyboard;
determining, by the computing device, which key was intended to be pressed based on the finger of the user, a row in which the key of the virtual keyboard is placed, and the selected mapping;
performing, by the computing device, functionality associated with pressing the intended key; and
revising, by the computing device, the selected mapping based on input received from the user responsive to performing the functionality associated with pressing the intended key.

17. The method of claim 16, wherein revising the selected mapping comprises:
prompting, by the computing device, the user to confirm a potential revision to the selected mapping based on the received input; and
responsive to receiving confirmation from the user, revising, by the computing device, the selected mapping with the potential revision.

18. The method of claim 17, wherein performing the functionality associated with pressing the intended key comprises making available for display to the user, by the computing device, an indication of a corrected letter associated with the intended key, wherein the corrected letter is different from a selected letter associated with the pressed key, and wherein the input received from the user is an edit to the corrected letter.

19. The method of claim 18, wherein revising the selected mapping is responsive to receiving a predetermined number of edits from the user.

20. The method of claim 16, further comprising:
determining, by the computing device, that a set of keys of the virtual keyboard have been simultaneously pressed;
determining, by the computing device, a set of fingers of the user used to press the set of keys of the virtual keyboard;
determining, by the computing device, a set of intended keys which were intended to be pressed based on the determined set of keys, the set of fingers of the user, and the selected mapping; and
performing, by the computing device, functionality associated with pressing the set of intended keys.

* * * * *